United States Patent
Tomimitsu

(10) Patent No.: US 8,174,619 B2
(45) Date of Patent: May 8, 2012

(54) RECEPTION APPARATUS AND METHOD OF CONTROLLING IMAGE OUTPUT BY RECEPTION APPARATUS

(75) Inventor: Takahiro Tomimitsu, Kanagawa (JP)

(73) Assignee: Sony Corporation (JP)

( * ) Notice: Subject to any disclaimer, the term of this patent is extended or adjusted under 35 U.S.C. 154(b) by 823 days.

(21) Appl. No.: 12/283,941

(22) Filed: Sep. 17, 2008

(65) Prior Publication Data

US 2009/0079877 A1    Mar. 26, 2009

(30) Foreign Application Priority Data

Sep. 21, 2007 (JP) .............. P2007-244673

(51) Int. Cl.
*N04N 5/14* (2006.01)
*N04N 9/64* (2006.01)

(52) U.S. Cl. ........ 348/571; 348/708; 348/518; 386/126; 386/219; 386/231; 386/353; 386/200; 386/358; 725/151

(58) Field of Classification Search .............. 348/571, 348/708, 518; 386/126, 219, 231, 353, 200, 386/358; 725/151

See application file for complete search history.

(56) References Cited

U.S. PATENT DOCUMENTS 5,537,148 A * 7/1996 Fujinami ............. 348/473
2005/0165967 A1 * 7/2005 Woolgar ............. 710/1
2006/0001554 A1 * 1/2006 Morishita ............. 341/50
2006/0092893 A1 * 5/2006 Champion et al. ........ 370/338
2006/0256241 A1 * 11/2006 Suzuki et al. ............ 348/706

FOREIGN PATENT DOCUMENTS

JP    2006-319503 A    11/2006

* cited by examiner

*Primary Examiner* — Jefferey Harold
*Assistant Examiner* — Mustafizur Rahman
(74) *Attorney, Agent, or Firm* — Lerner, David, Littenberg, Krumholz & Mentlik, LLP

(57) ABSTRACT

Disclosed herein is a reception apparatus including: a signal reception section configured to receive a video signal transmitted via a transmission path; an image display section configured to process the video signal to display an image; a timing information acquisition section configured to acquire timing information in connection with reception of the video signal, the timing information concerning timing that affects the image displayed by the image display section; a reference time length adjustment section configured to adjust a reference time length based on the timing information, the reference time length being used as a reference for a length of a time period from the reception of the video signal to start of image display; and a display control section configured to control timing at which the image display is started, based on the reference time length adjusted by the reference time length adjustment section.

8 Claims, 16 Drawing Sheets

F I G . 6

| PIN | SIGNAL ASSIGNMENT |
|---|---|
| 1 | TMDS DATA2+ |
| 3 | TMDS DATA2- |
| 5 | TMDS DATA1 SHIELD |
| 7 | TMDS DATA0+ |
| 9 | TMDS DATA0- |
| 11 | TMDS CLOCK SHIELD |
| 13 | CEC |
| 15 | SCL |
| 17 | DDC/CEC GROUND |
| 19 | HOT PLUG DETECT |

| PIN | SIGNAL ASSIGNMENT |
|---|---|
| 2 | TMDS DATA2 SHIELD |
| 4 | TMDS DATA1+ |
| 6 | TMDS DATA1- |
| 8 | TMDS DATA0 SHIELD |
| 10 | TMDS CLOCK+ |
| 12 | TMDS CLOCK- |
| 14 | RESERVED(N.C ON DEVICE) |
| 16 | SDA |
| 18 | +5V POWER |

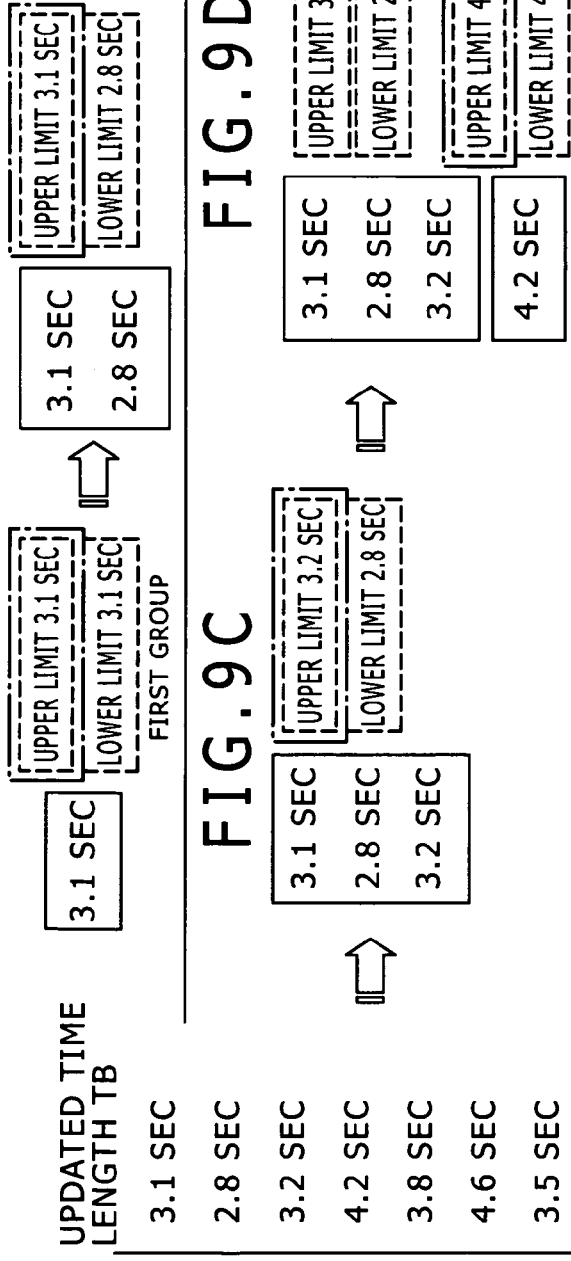

FIG.10A (10 SEC)→4.3 SEC(4.3 SEC)→4.8 SEC(4.8 SEC)→4.2 SEC(4.2 SEC)

FIG.10B (10 SEC)→4.3 SEC(4.3 SEC)→4.8 SEC(4.8 SEC)→4.2 SEC(4.8 SEC)

FIG.10C (10 SEC)→4.8 SEC(4.8 SEC)→4.4 SEC(4.8 SEC) [WITHIN ± 0.5 SEC]
→3.8 SEC(3.8 SEC) [NOT WITHIN ± 0.5 SEC]

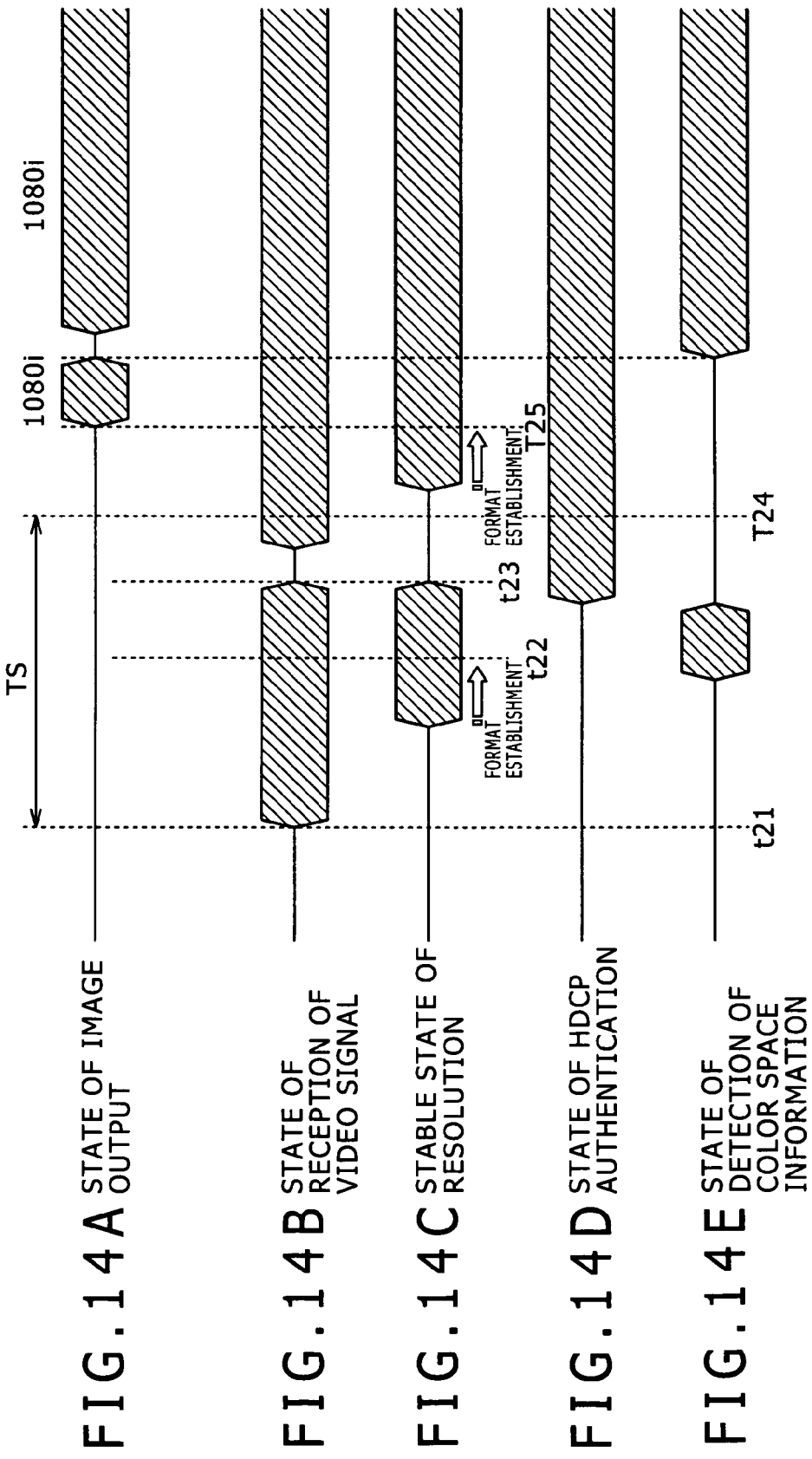

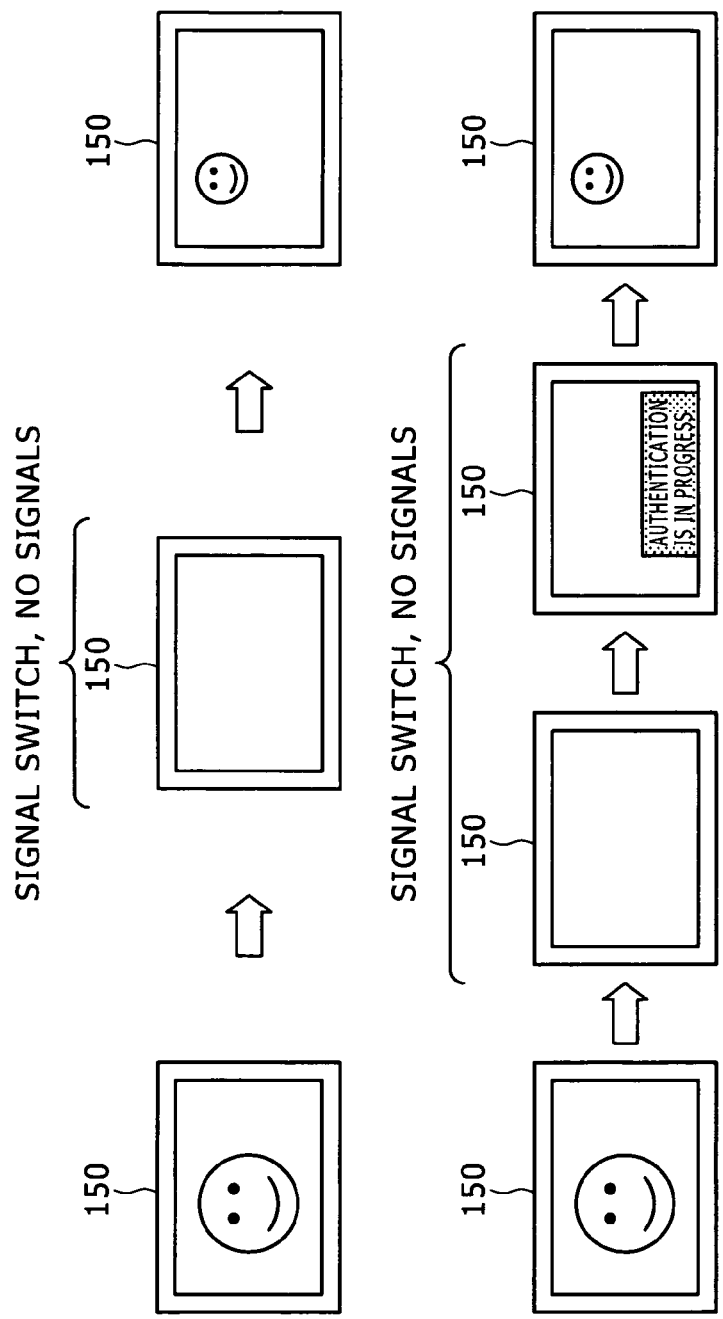

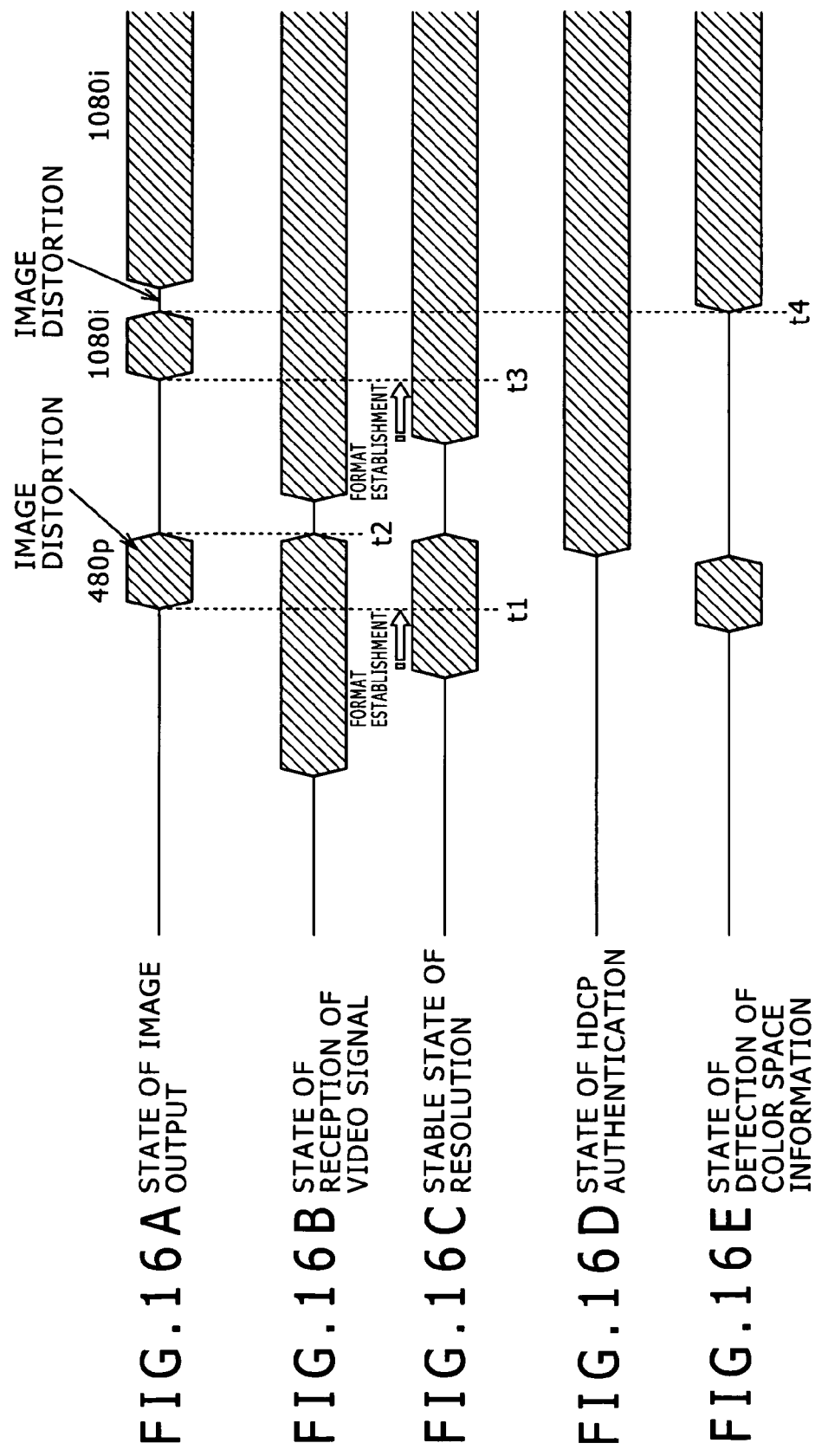

under patent)

RECEPTION APPARATUS AND METHOD OF CONTROLLING IMAGE OUTPUT BY RECEPTION APPARATUS

CROSS REFERENCES TO RELATED APPLICATIONS

The present application claims priority from Japanese Patent Application No. JP 2007-244673, filed in the Japanese Patent Office on Sep. 21, 2007, the entire content of which is incorporated herein by reference.

BACKGROUND OF THE INVENTION

1. Field of the Invention

The present invention relates to a reception apparatus and a method of controlling image output by the reception apparatus. In particular, the present invention relates to a reception apparatus and a method of controlling image output by the reception apparatus, which adjust a reference time length, which is used as a reference for the length of a time period from reception of a video signal to start of image display, based on timing information, which is acquired in connection with the reception of the video signal and which concerns timing that affects the image display, and control the timing at which the image display is started based on the reference time length, in order to avoid display of a distorted image effectively without a considerable delay in the image display.

2. Description of the Related Art

High-Definition Multimedia Interface (HDMI) is becoming increasingly widespread as a communication interface for transferring, at a high speed, a digital video signal, i.e., an uncompressed (baseband) video signal (hereinafter referred to as "video data"), and a digital audio signal (hereinafter referred to as "audio data") that accompanies the video signal from a Digital Versatile Disc (DVD) recorder, a set-top box, or other AV sources (audiovisual sources) to a television receiver, a projector, or other displays, for example (see Japanese patent Laid-open No. 2006-319503, for example).

SUMMARY OF THE INVENTION

When the above displays receive the video signal from the AV source and display images based on the video signal, the video signal may be interrupted or distorted owing to authentication timing of the High-bandwidth Digital Content Protection (HDCP) system, a change in resolution, or the like on the part of the AV source. When this happens, the images displayed on the displays will be distorted.

One current approach to address the above problem is to start image output (image display) after horizontal and vertical resolutions become stable to establish a format. FIGS. 16A to 16E show an example of signal timing.

FIG. 16B represents the state of the reception of the video signal. In FIG. 16B, periods in which the video signal is being received are indicated by diagonal shading. In this case, the display judges that the video signal is being received, when synchronization signals (i.e., horizontal and vertical synchronization signals) are detected.

FIG. 16C represents a stable state of the resolution. In FIG. 16C, periods in which the resolution is stable are indicated by diagonal shading. In this case, while the resolution is in the stable state, the display counts the horizontal synchronization signal to recognize the horizontal resolution and counts the vertical synchronization signal to recognize the vertical resolution, and establishes the format.

FIG. 16D represents the state of HDCP authentication. In FIG. 16D, a time period after the authentication is indicated by diagonal shading. In this case, the display recognizes start of the authentication through a display data channel (DDC).

FIG. 16E represents the state of detection of a color space. In FIG. 16E, periods in which the color space is being detected are indicated by diagonal shading. In this case, the display detects color space information via an auxiliary video information (AVI) InfoFrame inserted in a blanking period of the video signal.

FIG. 16A represents the state of the image output by the display. The display continues to display images from time point t1, at which the format is established, to time point t2, at which the reception of the video signal is interrupted. The video signal received during this time period is a video signal before the HDCP authentication, and the resolution of this video signal may differ from a set resolution. For example, as shown in FIG. 16A, the resolution of the received video signal and the set resolution concerning the HDCP authentication may be 480p and 1080i, respectively. When the resolution of the received video signal and the set resolution are different from each other as in this case, the images displayed will be distorted.

After the HDCP authentication, the resolution of the video signal to be received is switched to the set resolution, and a new format is established at time point t3. Then, the display displays images. Thereafter, a change occurs in the color space at time point t4, resulting in a signal switch. At this time, the images displayed will be distorted for a while.

As described above, even in the case where the image output (image display) is started after the horizontal and vertical resolutions become stable and the format is established, distorted images can be displayed.

The present invention addresses the above-identified, and other problems associated with existing methods and apparatuses, and has been devised to avoid the display of a distorted image effectively without a considerable delay in the display of the images.

According to one embodiment of the present invention, there is provided a reception apparatus including: a signal reception section configured to receive a video signal transmitted via a transmission path; an image display section configured to process the video signal received by the signal reception section to display an image; a timing information acquisition section configured to acquire timing information in connection with reception of the video signal by the signal reception section, the timing information concerning timing that affects the image displayed by the image display section; a reference time length adjustment section configured to adjust a reference time length based on the timing information acquired by the timing information acquisition section, the reference time length being used as a reference for a length of a time period from the reception of the video signal by the signal reception section to start of image display by the image display section; and a display control section configured to control timing at which the image display by the image display section is started, based on the reference time length adjusted by the reference time length adjustment section.

In the above reception apparatus, the video signal transmitted via the transmission path is received by the signal reception section. Then, the received video signal is processed by the image display section to display the image. The above-described reception apparatus may be connected, via an HDMI communication interface, to a DVD recorder, a set-top box, or other AV sources which transmit the video signal, for example. That is, the video signal received by the signal reception section may be in the form of differential signals which are transmitted from such an AV source over a plurality of channels in the transmission path.

The timing information concerning the timing that affects the image displayed by the image display section is acquired by the timing information acquisition section in connection with the reception of the video signal by the signal reception section. Examples of the timing information include: information concerning a timing at which the reception of the video signal is interrupted; information concerning a timing at which a format is established; information concerning a timing at which HDCP authentication is completed; and information concerning a timing at which a change occurs in a color space.

The reference time length, which is used as the reference for the length of the time period from the reception of the video signal by the signal reception section to the start of the image display by the image display section, is adjusted by the reference time length adjustment section based on the timing information acquired by the timing information acquisition section. Then, the timing at which the image display by the image display section is started is controlled by the display control section based on the reference time length adjusted by the reference time length adjustment section.

For example, the reference time length adjustment section may generate a new reference time length based on the timing information acquired by the timing information acquisition section, and update the reference time length stored in a storage section by referring to the new reference time length. In this case, the display control section may control the timing at which the image display by the image display section is started, based on the reference time length stored in the storage section.

As described above, according to the above-described reception apparatus, the reference time length, which is used as the reference for the length of the time period from the reception of the video signal to the start of the image display, is adjusted based on the timing information, which is acquired in connection with the reception of the video signal and which concerns the timing that affects the image display, and based on this reference time length, the timing at which the image display is started is controlled. This makes it possible to avoid the display of a distorted image effectively, without a considerable delay in display of images.

Also, the above-described reception apparatus may further include a user operation section configured to allow a user to select a first image output mode or a second image output mode, wherein, when the first image output mode is selected by the user operation section, the display control section controls the timing at which the image display by the image display section is started, based on the reference time length adjusted by the reference time length adjustment section, and when the second image output mode is selected by the user operation section, the display control section controls the timing at which the image display by the image display section is started, based on a fixed reference time length.

In this case, when the first image output mode is selected via the user operation section, the timing at which the image display by the image display section is started is controlled based on the reference time length as adjusted by the reference time length adjustment section. As described above, this contributes to avoiding the display of a distorted image effectively without a considerable delay in the display of the images. On the other hand, when the second image output mode is selected via the user operation section, the timing at which the image display by the image display section is started is controlled based on the fixed reference time length.

Accordingly, by setting the fixed reference time length at a small value, for example, it is possible to reduce the length of the time period from the reception of the video signal to the start of the image display, although this involves an increase in the probability of the display of a distorted image.

Also, the above-described reception apparatus may further include a format establishment judging section configured to judge whether or not a format is established based on resolution information included in the video signal received by the signal reception section, wherein the display control section controls the timing at which the image display by the image display section is started, based on the reference time length adjusted by the reference time length adjustment section and whether or not the format is established as judged by the format establishment judging section. In this case, no image is displayed unless the format is established, even if a time of the reference time length as adjusted by the reference time length adjustment section has elapsed. This contributes to reducing the probability of the display of a distorted image, because no image is displayed until the format is established.

According to another embodiment of the present invention, there is provided a method of controlling image output by a reception apparatus including a signal reception section configured to receive a video signal transmitted via a transmission path and an image display section configured to process the video signal received by the signal reception section to display an image, the method including the steps of: acquiring timing information in connection with reception of the video signal by the signal reception section, the timing information concerning timing that affects the image displayed by the image display section; adjusting a reference time length based on the timing information acquired by the acquiring, the reference time length being used as a reference for a length of a time period from the reception of the video signal by the signal reception section to start of image display by the image display section; and controlling timing at which the image display by the image display section is started, based on the reference time length adjusted by the adjusting.

According to the present invention, the reference time length, which is used as the reference for the length of the time period from the reception of the video signal to the start of the image display, is adjusted based on the timing information, which is acquired in connection with the reception of the video signal and which concerns the timing that affects the image display, and based on the reference time length, the timing at which the image display is started is controlled. This makes it possible to avoid the display of a distorted image effectively, without a considerable delay in the display of images.

BRIEF DESCRIPTION OF THE DRAWINGS

FIG. 6 is a diagram illustrating a pinout (Type A) of an HDMI port;

FIG. 9 is a diagram for explaining an algorithm for grouping and determination of a reference time length;

FIGS. 10A to 10C illustrate other examples of adjustment of the reference time length TS;

FIGS. 14A to 14E show an example of signal timing in the television receiver;

FIGS. 15A and 15B illustrate exemplary transitions of the image display in the case where a message is not displayed to inform the user that an authentication operation is in progress and in the case where such a message is displayed, respectively; and FIGS. 16A to 16E show an example of signal timing in a related-art television receiver.

DETAILED DESCRIPTION OF THE PREFERRED EMBODIMENTS

Figure 1:
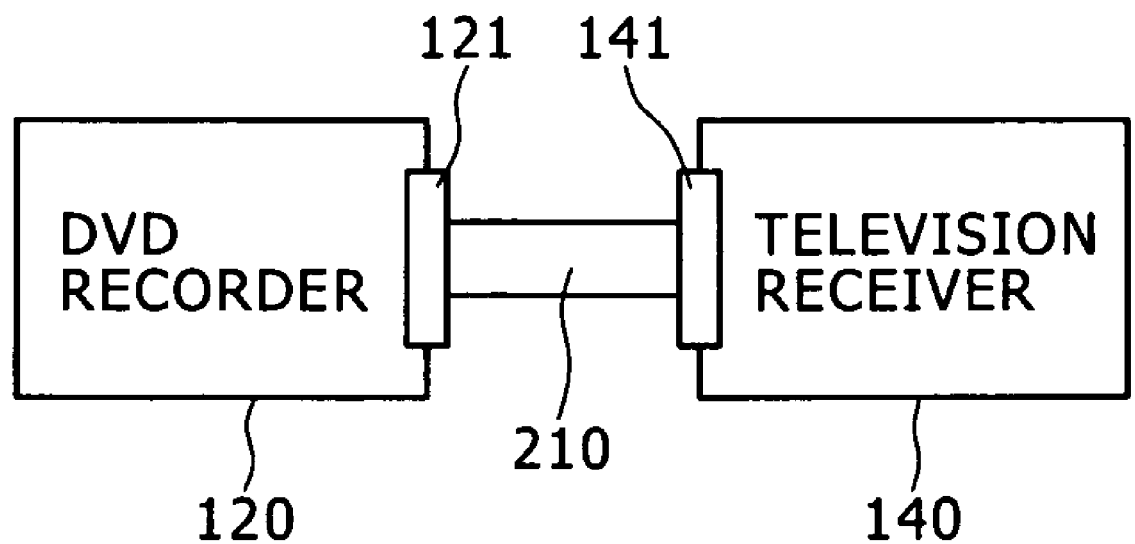
FIG. 1 is a block diagram illustrating an exemplary structure of an AV system according to one embodiment of the present invention.

Hereinafter, preferred embodiments of the present invention will be described with reference to the accompanying drawings. FIG. 1 shows an exemplary structure of an audio-visual (AV) system 100 according to one embodiment of the present invention.

The AV system 100 includes a Digital Versatile Disc (DVD) recorder 120 and a television receiver 140. The DVD recorder 120 forms an HDMI source device. The television receiver 140 forms an HDMI sink device.

The DVD recorder 120 and the television receiver 140 are connected to each other via an HDMI cable 210. Specifically, an end of the HDMI cable 210 is connected to an HDMI port 121 included in the DVD recorder 120, while the other end of the HDMI cable 210 is connected to an HDMI port 141 included in the television receiver 140.

Figure 2:
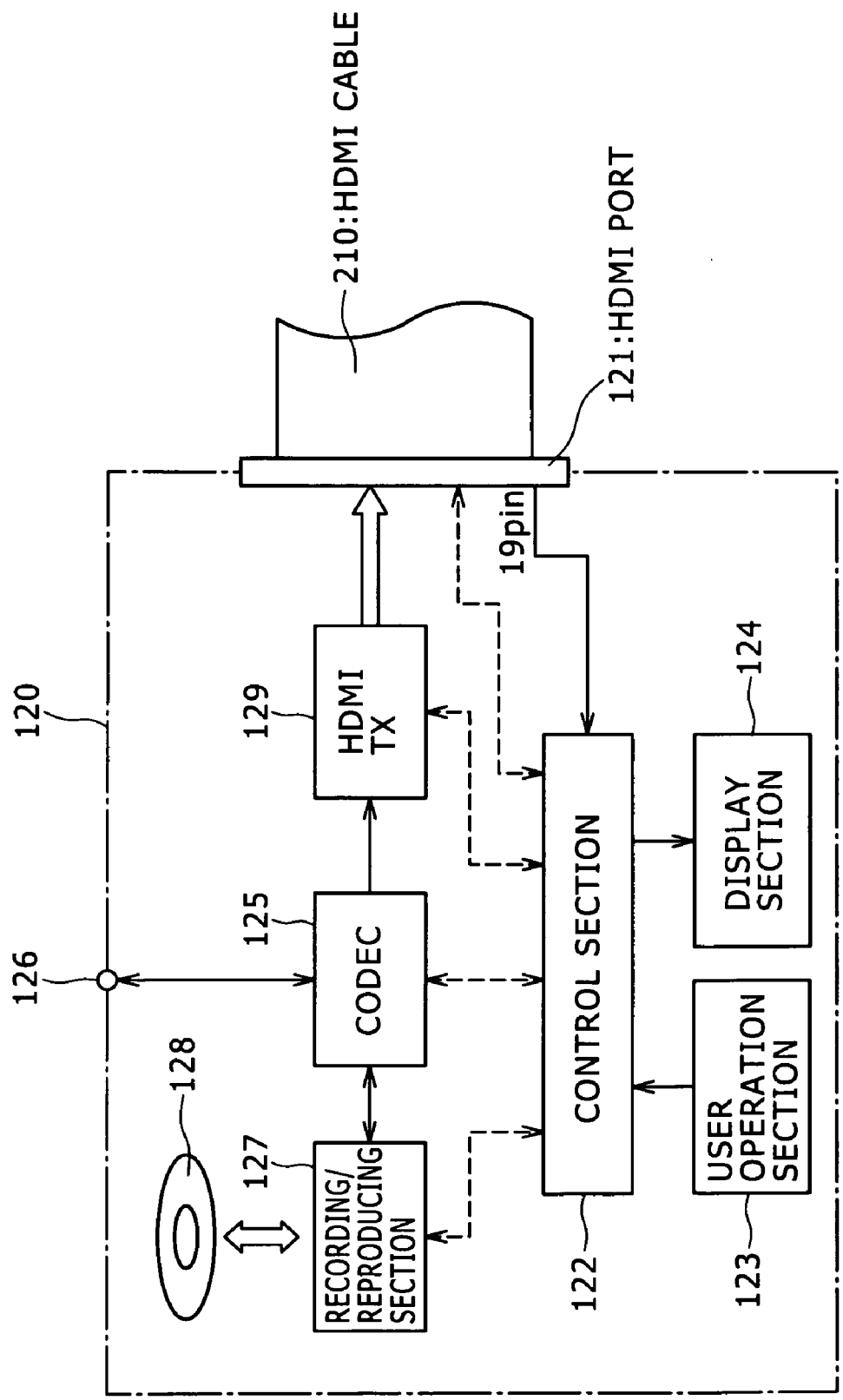
FIG. 2 is a block diagram illustrating an exemplary structure of a DVD recorder (a source device) that forms part of the AV system.

FIG. 2 shows an exemplary structure of the DVD recorder 120. The DVD recorder 120 includes the HDMI port 121, a control section 122, a user operation section 123, a display section 124, a codec 125, a port 126 for connection with an external device, a recording/reproducing section 127, and an HDMI transmission section (HDMI source) 129.

The control section 122 controls the operation of each part of the DVD recorder 120. The user operation section 123 and the display section 124 form a user interface, and they are connected to the control section 122. Examples of components of the user operation section 123 include a key, a button, and a dial arranged on a housing (not shown) of the DVD recorder 120, and a touch panel arranged on a display surface of the display section 124. Examples of the display section 124 include a liquid crystal display (LCD).

The recording/reproducing section 127 records encoded data supplied from the codec 125 onto a DVD 128. This encoded data is obtained by encoding video data (a video signal) and audio data (an audio signal) that accompanies the video data in accordance with an MPEG (Moving Picture Experts Group) system, for example. Also, the recording/reproducing section 127 reads the encoded data from the DVD 128 and supplies it to the codec 125.

The codec 125 decodes the encoded data supplied from the recording/reproducing section 127 in accordance with the MPEG system or the like to obtain baseband (uncompressed) video and audio data. The codec 125 supplies the baseband video and audio data to the HDMI transmission section (i.e., the HDMI source) 129, and also outputs the baseband video and audio data to the port 126. In addition, the codec 125 encodes baseband video and audio data, which are inputted from the external device (not shown) to the port 126, and supplies the resulting encoded data to the recording/reproducing section 127. Here, examples of the external device include an HD recorder, a personal computer, a DVD recorder, and a video camera.

The HDMI transmission section 129 is connected to the HDMI port 121. The HDMI transmission section 129 transmits the baseband video and audio data, which are supplied from the codec 125, unidirectionally from the HDMI port 121 to the television receiver 140 via the HDMI cable 210 by HDMI-compliant communication. Details of the HDMI transmission section 129 will be described later.

Figure 3:
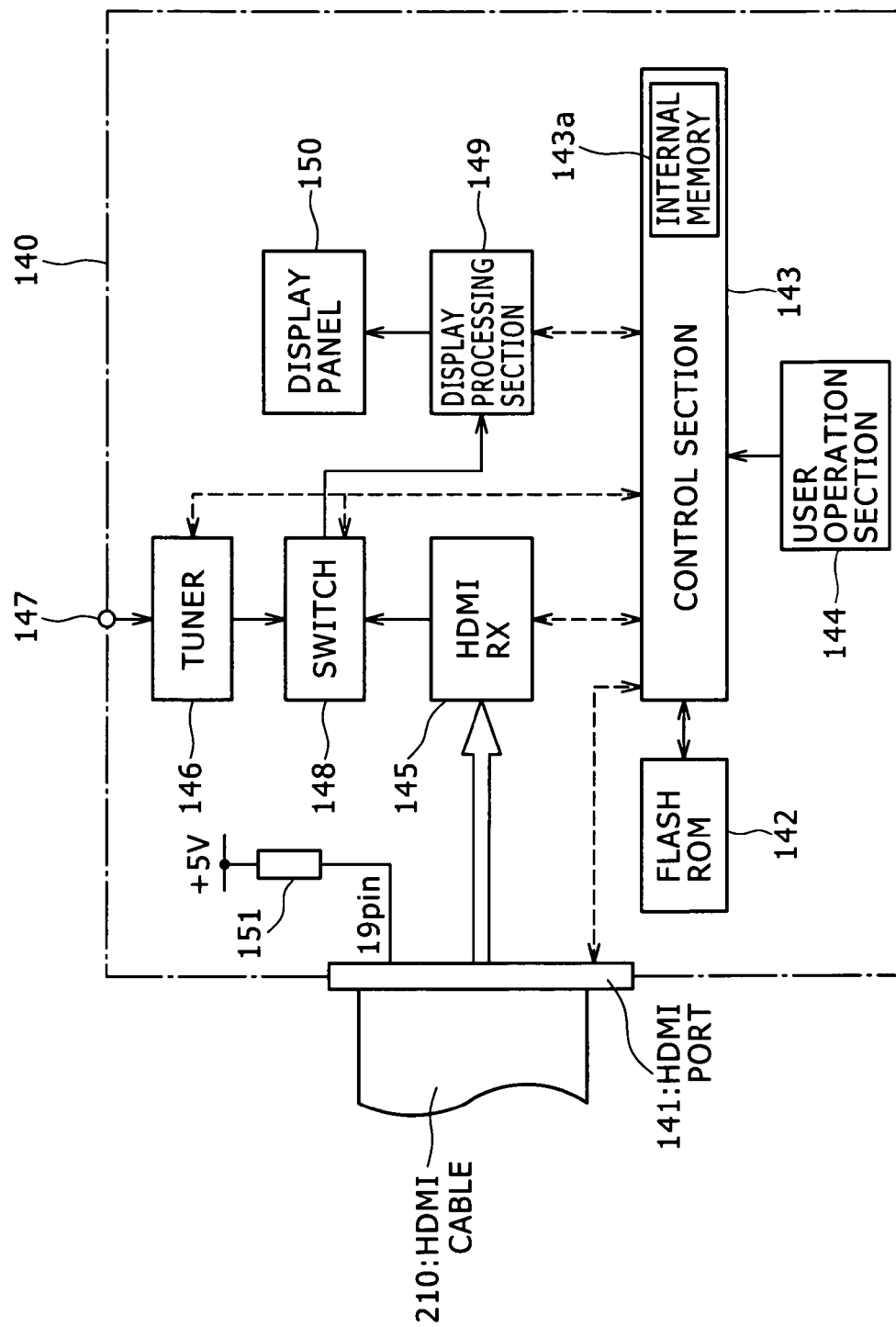
FIG. 3 is a block diagram illustrating an exemplary structure of a television receiver (a sink device) that forms part of the AV system.

FIG. 3 shows an exemplary structure of the television receiver 140. The television receiver 140 includes the HDMI port 141, a flash ROM 142, a control section 143, a user operation section 144, an HDMI reception section (HDMI sink) 145, a tuner 146, an antenna port 147, a switch 148, a display processing section 149, a display panel 150, and a pull-up resistor 151.

The control section 143 controls the operation of each part of the television receiver 140. The user operation section 144 forms a user interface, and is connected to the control section 143. Examples of the user operation section 144 include a key, a button, and a dial arranged on a housing (not shown) of the television receiver 140, and a remote control. The flash ROM 142 is used to store EDID information and so on, and is connected to the control section 143.

The HDMI reception section 145 is connected to the HDMI port 141. The HDMI reception section 145 receives, via the HDMI-compliant communication, the baseband video and audio data, which are transmitted unidirectionally from the HDMI transmission section 129 of the DVD recorder 120, which is connected with the HDMI reception section 145 via the HDMI cable 210. The HDMI reception section 145 supplies the received video data to the switch 148. Meanwhile, the audio data received by the HDMI reception section 145 is supplied to another switch to be used for the audio data. Details of the HDMI reception section 145 will be described later.

The tuner 146 is used to receive BS broadcasting, digital terrestrial broadcasting, or the like. A broadcast signal captured by an antenna (not shown) connected to the antenna port 147 is supplied to the tuner 146. The tuner 146 acquires video data (a video signal) and audio data of a given program based on the broadcast signal. The switch 148 selectively takes either the video data received by the HDMI reception section 145 or the video data acquired by the tuner 146.

The display processing section 149 subjects the video data taken by the switch 148 to a process such as color control, edge enhancement, or superimposition of graphics data. The display panel 150 displays images based on the video data processed by the display processing section 149. Examples of the display panel 150 include a liquid crystal display (LCD), an organic electro-luminescence (EL) display, and a plasma display panel (PDP).

As will be described later, 19 pins of the HDMI port 141 are Hot Plug Detect (HPD) terminals. The 19 pins of the HDMI port 141 are connected to a +5V power supply via the pull-up resistor 151. When the television receiver 140 is connected to the DVD recorder 120 via the HDMI cable 210, power is supplied from the DVD recorder 120, resulting in an increase in voltage of the 19 pins of the HDMI port 141. The control section 122 of the DVD recorder 120 monitors the voltage of 19 pins of the HDMI port 121, and recognizes the connection with the television receiver 140 by detecting an increase in the voltage of the 19 pins.

Figure 4:
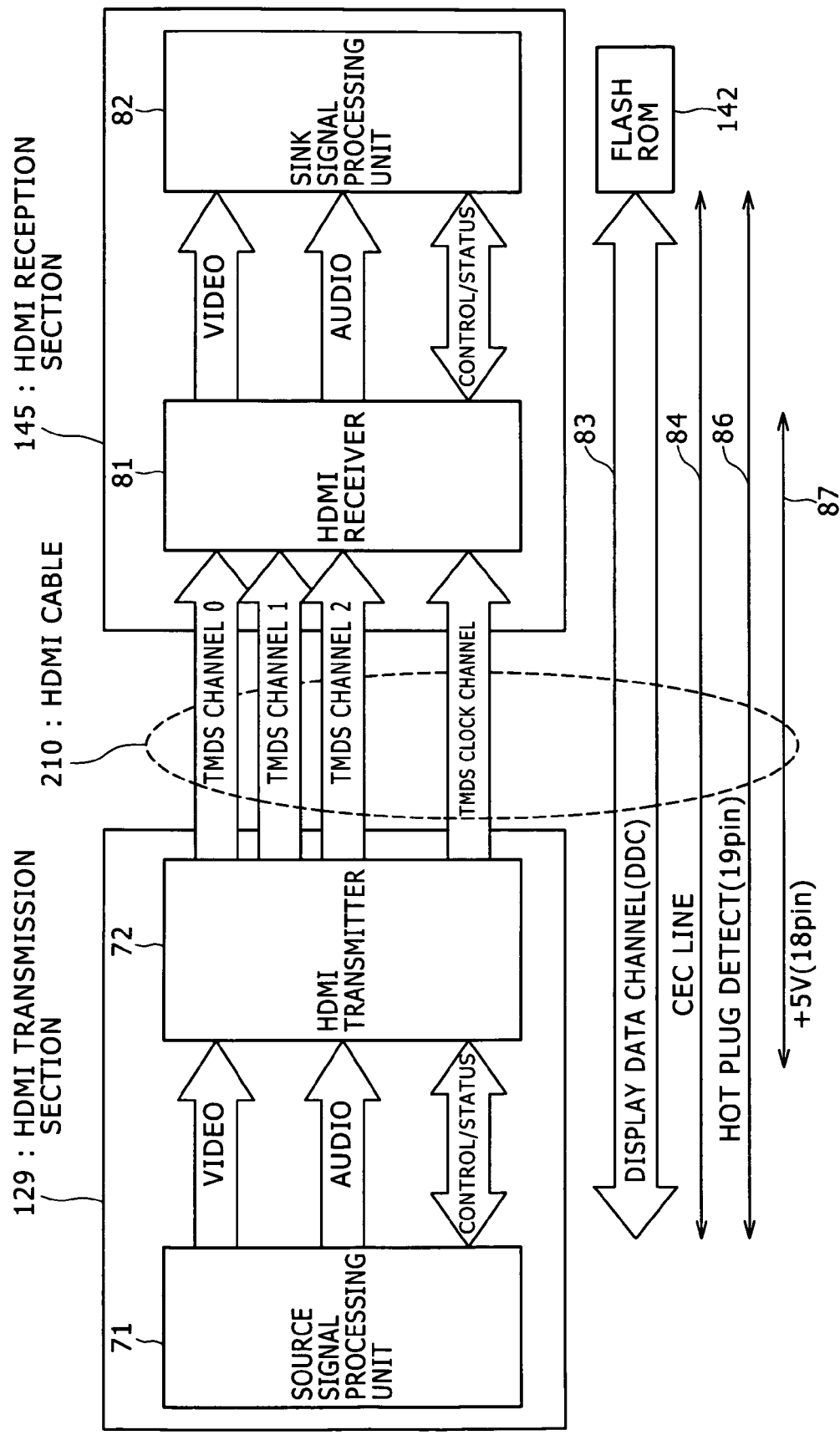
FIG. 4 is a block diagram illustrating exemplary structures of an HDMI transmission section (an HDMI source) and an HDMI reception section (an HDMI sink)

FIG. 4 shows exemplary structures of the HDMI transmission section (i.e., the HDMI source) 129 of the DVD recorder 120 and the HDMI reception section (i.e., the HDMI sink) 145 of the television receiver 140 in the AV system 100 as shown in FIG. 1.

The HDMI transmission section 129 unidirectionally transmits differential signals corresponding to one frame of baseband (uncompressed) video data to the HDMI reception section 145 over a plurality of channels, in an effective video period (hereinafter referred to as an "active video period" as appropriate). The active video period refers to a period extending from one vertical synchronization signal to the next vertical synchronization signal (hereinafter referred to as a "video field" as appropriate) but excluding horizontal blanking periods and a vertical blanking period. In addition, the HDMI transmission section 129 unidirectionally transmits differential signals corresponding to the audio data accompanying the video data, a control packet, other auxiliary data, and so on to the HDMI reception section 145 over a plurality of channels in the horizontal and vertical blanking periods.

The HDMI transmission section 129 includes a source signal processing unit 71 and an HDMI transmitter 72. The baseband (uncompressed) video and audio data are supplied from the codec 125 (see FIG. 2) to the source signal processing unit 71. The source signal processing unit 71 subjects the supplied video and audio data to necessary processing, and supplies resultant data to the HDMI transmitter 72. In addition, the source signal processing unit 71 exchanges control-use information, information for status notification, and so on (Control/Status) with the HDMI transmitter 72 as necessary.

The HDMI transmitter 72 converts the video data supplied from the source signal processing unit 71 into corresponding differential signals, and unidirectionally transmits the differential signals to the HDMI reception section 145 connected via the HDMI cable 210 over three TMDS channels #0, #1, and #2, i.e., the aforementioned plurality of channels.

In addition, the HDMI transmitter 72 converts control data, such as the vertical synchronization signals (VSYNC) and the horizontal synchronization signals (HSYNC), and the audio data that accompanies the uncompressed video data, the control packet, and the other auxiliary data, which are supplied from the source signal processing unit 71, into corresponding differential signals, and unidirectionally transmits the differential signals to the HDMI reception section 145 connected via the HDMI cable 210 over the three TMDS channels #0, #1, and #2.

Note that the HDMI transmitter 72 encrypts the data to be transmitted over the three TMDS channels #0, #1, and #2 using a digital encryption system called a High-bandwidth Digital Content Protection (HDCP) system, before transmitting the data.

In addition, the HDMI transmitter 72 transmits a pixel clock, which is synchronized with the video data which is transmitted over the three TMDS channels #0, #1, and #2, to the HDMI reception section 145 connected via the HDMI cable 210 over a TMDS clock channel.

The HDMI reception section 145 receives, in the active video period, the differential signals corresponding to the video data, which are unidirectionally transmitted from the HDMI transmission section 129 over the plurality of channels, and receives, in the horizontal and vertical blanking periods, the differential signals corresponding to the auxiliary data and the control data, which are transmitted from the HDMI transmission section 129 over the plurality of channels.

The HDMI reception section 145 includes an HDMI receiver 81 and a sink signal processing unit 82. The HDMI receiver 81 receives the differential signals corresponding to the video data and the differential signals corresponding to the auxiliary data and the control data, which are unidirectionally transmitted from the HDMI transmission section 129 connected via the HDMI cable 210 over the TMDS channels #0, #1, and #2, in synchronism with the pixel clock, which is transmitted from the HDMI transmission section 129 over the TMDS clock channel.

The HDMI receiver 81 converts the received differential signals into the corresponding video, auxiliary, and control data, and supplies them to the sink signal processing unit 82 as necessary. Because the data transmitted from the HDMI transmission section 129 over the three TMDS channels #0, #1, and #2 have been encrypted as described above, the HDMI receiver 81 decrypts the received data.

The sink signal processing unit 82 subjects the data supplied from the HDMI receiver 81 to necessary processing, and supplies resultant data to the switch 148 (see FIG. 3). Moreover, the sink signal processing unit 82 exchanges control-use information, information for status notification, and so on (Control/Status) with the HDMI receiver 81 as necessary.

HDMI transmission channels include a display data channel (DDC) 83 and a transmission channel called a CEC line 84, in addition to the three TMDS channels #0, #1, and #2, which are used to serially transmit the video data, the auxiliary data, and the control data unidirectionally from the HDMI transmission section 129 to the HDMI reception section 145 in synchronism with the pixel clock, and the TMDS clock channel, which is used to transmit the pixel clock.

The DDC 83 is composed of two lines (signal lines) (not shown) included in the HDMI cable 210. The DDC 83 is used for the DVD recorder 120 to read extended display identification (EDID) information from the flash ROM 142 in the television receiver 140 connected via the HDMI cable 210. The control section 122 of the DVD recorder 120 recognizes settings in and performance capabilities of the television receiver 140 based on the EDID information.

In addition, the DDC 83 is used to perform an HDCP authentication operation. Information necessary for the HDCP authentication is transmitted over the DDC 83, and after verifying that the television receiver 140 is an authorized device, the DVD recorder 120 becomes capable of encryption transmission.

The CEC line 84 is composed of one line (not shown) included in the HDMI cable 210. The CEC line 84 is used for bidirectional communication of control-use data between the DVD recorder 120 and the television receiver 140.

Moreover, the HDMI cable 210 includes a line 86, which is connected to pins called Hot Plug Detect (HPD). The DVD recorder 120 uses the line 86 to detect the connection with the television receiver 140. Still further, the HDMI cable 210 includes a line 87, which is used to supply the power from the DVD recorder 120 to the television receiver 140.

Figure 5:
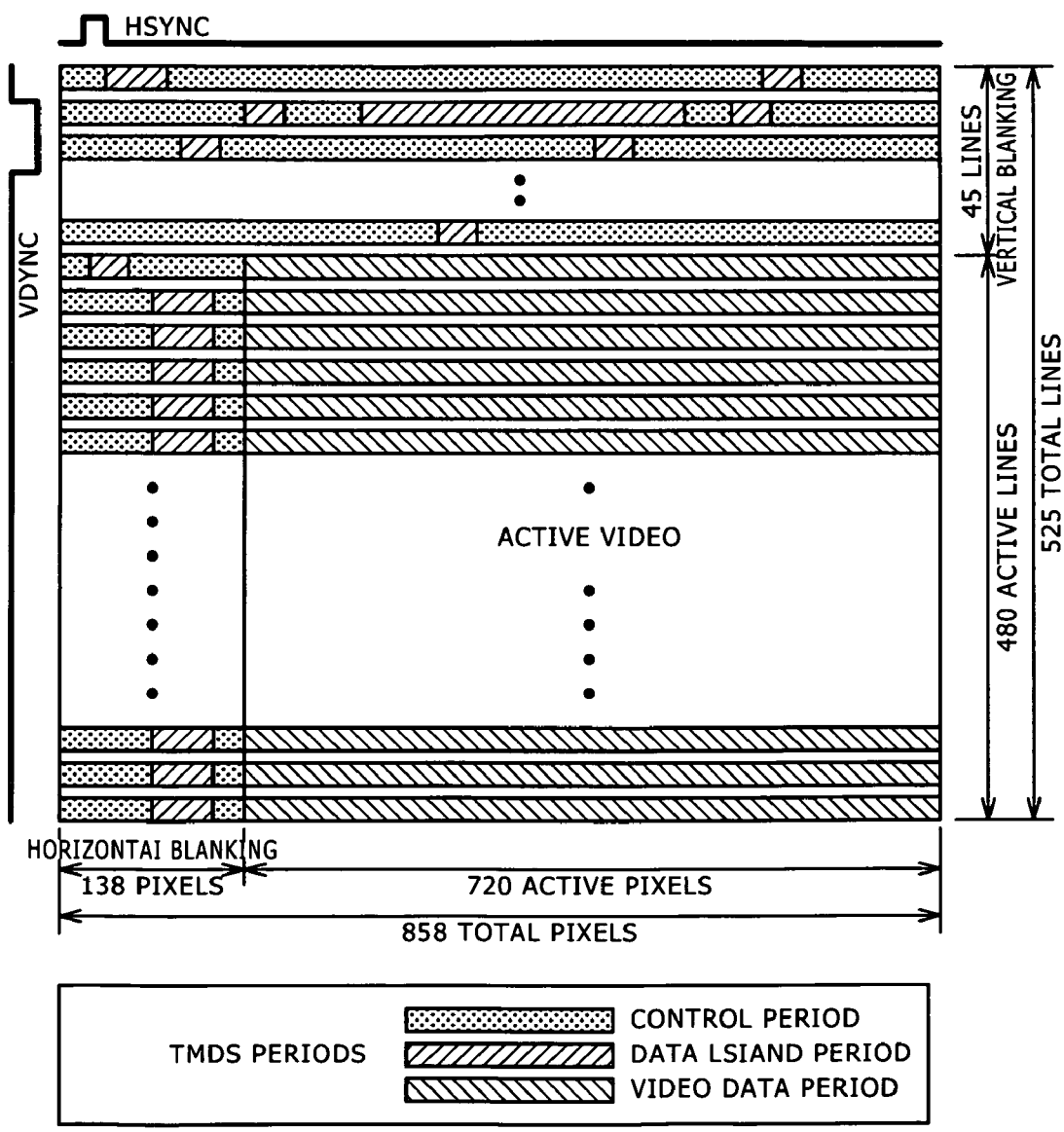
FIG. 5 is a diagram illustrating the structure of TMDS transmitted data.

FIG. 5 illustrates an example of a period in which the various types of data are transmitted over the three TMDS channels #0, #1, and #2 of HDMI. Note that FIG. 5 illustrates a period in which the various types of data are transmitted in the case where 720×480 progressive images are transmitted over the TMDS channels #0, #1, and #2.

The video field, in which the data are transmitted over the three TMDS channels #0, #1, and #2 of HDMI, includes three types of periods: a video data period, a data island period, and a control period, which differ in the type of the data transmitted therein.

Here, the video field period refers to the period that extends from a rising edge (an active edge) of one vertical synchronization signal to a rising edge of the next vertical synchronization signal. The video field period can be divided into the horizontal blanking period (horizontal blanking), the vertical blanking period (vertical blanking), and the active video period (Active Video). The active video period refers to a part of the video field period other than the horizontal and vertical blanking periods.

The video data period is assigned to the active video period. In the video data period, data of 720 (pixels per line)×480 (lines) effective pixels (active pixels), which constitutes one frame of uncompressed video data, is transmitted.

The data island period and the control period are assigned to the horizontal and vertical blanking periods. In the data island period and the control period, the auxiliary data is transmitted.

That is, the data island periods are assigned to parts of the horizontal and vertical blanking periods. In the data island periods, some of the auxiliary data which do not concern control, e.g., audio data packets, are transmitted.

The control periods are assigned to the other parts of the horizontal and vertical blanking periods. In the control periods, some of the auxiliary data which concern the control, e.g., the vertical and horizontal synchronization signals and the control packets, are transmitted.

Note that, in the current version of HDMI, the frequency of the pixel clock, which is transmitted over the TMDS clock channel, is 165 MHz, for example. In this case, the transmission rate of the data island period is approximately 500 Mbps.

FIG. 6 shows a pinout of the HDMI ports 121 and 141. This pinout is called Type A.

Two differential lines over which TMDS Data #i+ and TMDS Data #i−, which are the differential signals for TMDS channel #i, are transmitted are connected to pins (i.e., pins with pin numbers of 1, 4, and 7) to which TMDS Data #i+ is assigned and pins (i.e., pins with pin numbers of 3, 6, and 9) to which TMDS Data #i− is assigned.

The CEC line 84, over which a CEC signal, which is control-use data, is transmitted, is connected to a pin with a pin number of 13. A pin with a pin number of 14 is a reserved pin. A line over which a serial data (SDA) signal, such as the EDID information, is transmitted is connected to a pin with a pin number of 16. A line over which a serial clock (SCL) signal, which is a clock signal used for synchronization at the time of transmitting and receiving the SDA signal, is transmitted is connected to a pin with a pin number of 15. The aforementioned DDC 83 is composed of the line over which the SDA signal is transmitted and the line over which the SCL signal is transmitted.

The line 86, which is used for the DVD recorder (i.e., the source device) 120 to detect the connection with the television receiver (i.e., the sink device) 140 as described above, is connected to a pin with a pin number of 19. The line 87, which is used to supply the power as described above, is connected to a pin with a pin number of 18.

An exemplary operation of the AV system 100 as shown in FIG. 1 will now be described below.

First, an exemplary operation at the time of system construction, when the television receiver 140 is connected to the DVD recorder 120 via the HDMI cable 210, will now be described below.

At this time, the power is supplied from the DVD recorder 120 to the television receiver 140 via the line 87 in the HDMI cable 210 (see FIG. 4). As a result, the voltage at the 19 pins in the HDMI port 141 of the television receiver 140 is increased, and the voltage at the 19 pins in the HDMI port 121 of the DVD recorder 120 is also increased.

The control section 122 of the DVD recorder 120 is monitoring the voltage at the 19 pins in the HDMI port 121, and upon the increase in the voltage, the control section 122 recognizes that the television receiver 140 has been connected to the DVD recorder 120 via the HDMI cable 210. Then, the control section 122 uses the DDC 83 in the HDMI cable 210 to read the EDID information stored in the flash ROM 142 of the television receiver 140, thereby recognizing the settings in and the performance capabilities of the television receiver 140.

Next, an exemplary operation after the system construction will now be described below.

Suppose, for example, that the external device is connected with the port 126 of the DVD recorder 120 (see FIG. 2) and that a user operates the DVD recorder 120 to cause the data from the external device to be recorded. In this case, video and audio data from the external device are encoded by the codec 125, and the resulting encoded data is recorded by the recording/reproducing section 127 onto the DVD 128.

Also suppose that the user operates the DVD recorder 120 to cause the data recorded on the DVD 128 to be transmitted. In this case, the recording/reproducing section 127 reads the encoded data from the DVD 128, and supplies the read encoded data to the codec 125. The codec 125 decodes the encoded data read by the recording/reproducing section 127 to obtain the baseband video and audio data, and supplies the baseband video and audio data to the HDMI transmission section 129.

The HDMI transmission section 129 unidirectionally transmits the baseband video and audio data, which have been supplied from the codec 125, to the television receiver 140 via the HDMI cable 210 by the HDMI-compliant communication.

In the television receiver 140 (see FIG. 3), the HDMI reception section 145 receives, via the HDMI-compliant communication, the baseband video and audio data, which are unidirectionally transmitted from the HDMI transmission section 129 of the DVD recorder 120 via the HDMI cable 210.

The video data received by the HDMI reception section 145 is supplied to the display processing section 149 via the switch 148. Under control of the control section 143, the display processing section 149 subjects the video data to the process such as the color control, the edge enhancement, or the superimposition of the graphics data. Then, the display panel 150 displays the images based on the video data supplied from the display processing section 149.

Meanwhile, the audio data received by the HDMI reception section 145 is taken from the switch (not shown) used for the audio data and, after being converted into an analog signal, is supplied to a loudspeaker. Then, audio corresponding to the images displayed on the display panel 150 is outputted via the loudspeaker.

Here, the timing at which the image display is started will now be described below in the case where the images are displayed by the television receiver 140 based on the video data transmitted from the DVD recorder 120.

The control section 143 stores a reference time length in an internal memory 143a such as a RAM. The reference time length is used as a reference for the length of a time period from reception of the video data (i.e., the video signal) to start of the image display. If the reception of the video data from the DVD recorder 120 is started, the control section 143 controls the display processing section 149 to turn off mute when a time of the reference time length as stored in the aforementioned internal memory 143a has elapsed since the start of the reception of the video data, thereby initiating the display of the images on the display panel 150. In this sense, the control section 143 forms a display control section.

Figure 7:
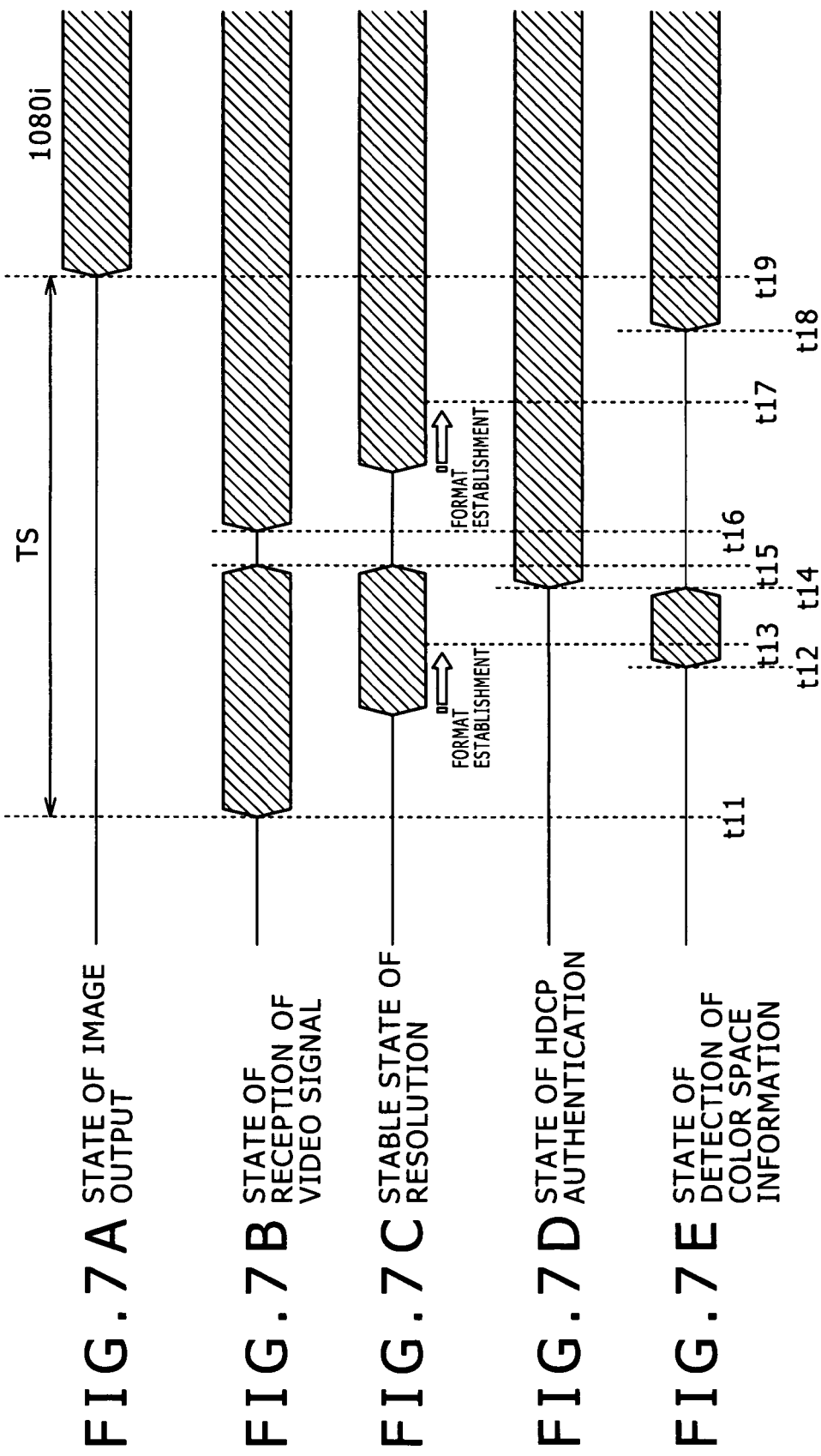
FIGS. 7A to 7E show an example of signal timing in the television receiver.

FIGS. 7A to 7E show an example of signal timing. FIG. 7B represents the state of the reception of the video data (i.e., the video signal). In FIG. 7B, periods in which the video data is being received are indicated by diagonal shading. In this case, the control section 143 judges that the video data is being received, when the synchronization signals (i.e., the horizontal and vertical synchronization signals) are received by the HDMI reception section 145.

FIG. 7C represents a stable state of the resolution. In FIG. 7C, periods in which the resolution is stable are indicated by diagonal shading. While the horizontal and vertical resolutions are in the stable state, the control section 143 counts the horizontal synchronization signal to recognize the horizontal resolution and counts the vertical synchronization signal to recognize the vertical resolution, and establishes a format.

FIG. 7D represents the state of the HDCP authentication. In FIG. 7D, a period after the authentication is indicated by diagonal shading. The control section 143 recognizes, via the display data channel (DDC), that the authentication has been completed in the DVD recorder 120. FIG. 7E represents the state of detection of a color space. In FIG. 7E, periods in which the color space is being detected are indicated by diagonal shading. The control section 143 detects color space information via an auxiliary video information (AVI) InfoFrame inserted in the blanking period of the video signal.

FIG. 7A represents the state of image output on the display panel 150. In FIG. 7A, a period in which the image output is in progress is indicated by diagonal shading. At time point t19, at which the time of the reference time length TS has elapsed since time point t11, at which the reception of the video data was started, the mute is turned off to start the image output. In this case, the time point t19 is subsequent to time point t15, at which the video data is interrupted, time points t13 and t17, at which the format is established, time point t14, at which the HDCP authentication is completed, and time points t12 and t18, at which a change occurs in the color space. Therefore, the images displayed on the display panel 150 are distorted neither by the interruption of the video data, nor by a change in the horizontal and vertical resolutions after the HDCP authentication, nor by the change in the color space.

In connection with the reception of the video data, the control section 143 of the television receiver 140 acquires timing information concerning timings that affect the images displayed on the display panel 150. For example, the control section 143 acquires: time length information representing the length of a time period from the time point t11, at which the reception of the video data is started, to the time point at which the video data is interrupted; time length information representing the length of a time period from the time point t11, at which the reception of the video data is started, to the time point at which the format is established; time length information representing the length of a time period from the time point t11, at which the reception of the video data is started, to the time point at which the HDCP authentication is completed; and time length information representing the length of a time period from the time point t11, at which the reception of the video data is started, to the time point at which a change occurs in the color space. In this sense, the control section 143 forms a timing information acquisition section.

In addition, the control section 143 adjusts the reference time length TS stored in the internal memory 143a, based on the acquired timing information. In this case, the reference time length TS stored in the internal memory 143a is updated to a time length that is greater, by a predetermined time length, than the greatest of the lengths of the time periods represented by the aforementioned pieces of time length information acquired as the timing information. In this sense, the control section 143 forms a reference time length adjustment section. The adjusted reference time length TS as stored in the internal memory 143a will be used when next video data is received.

Figure 8:
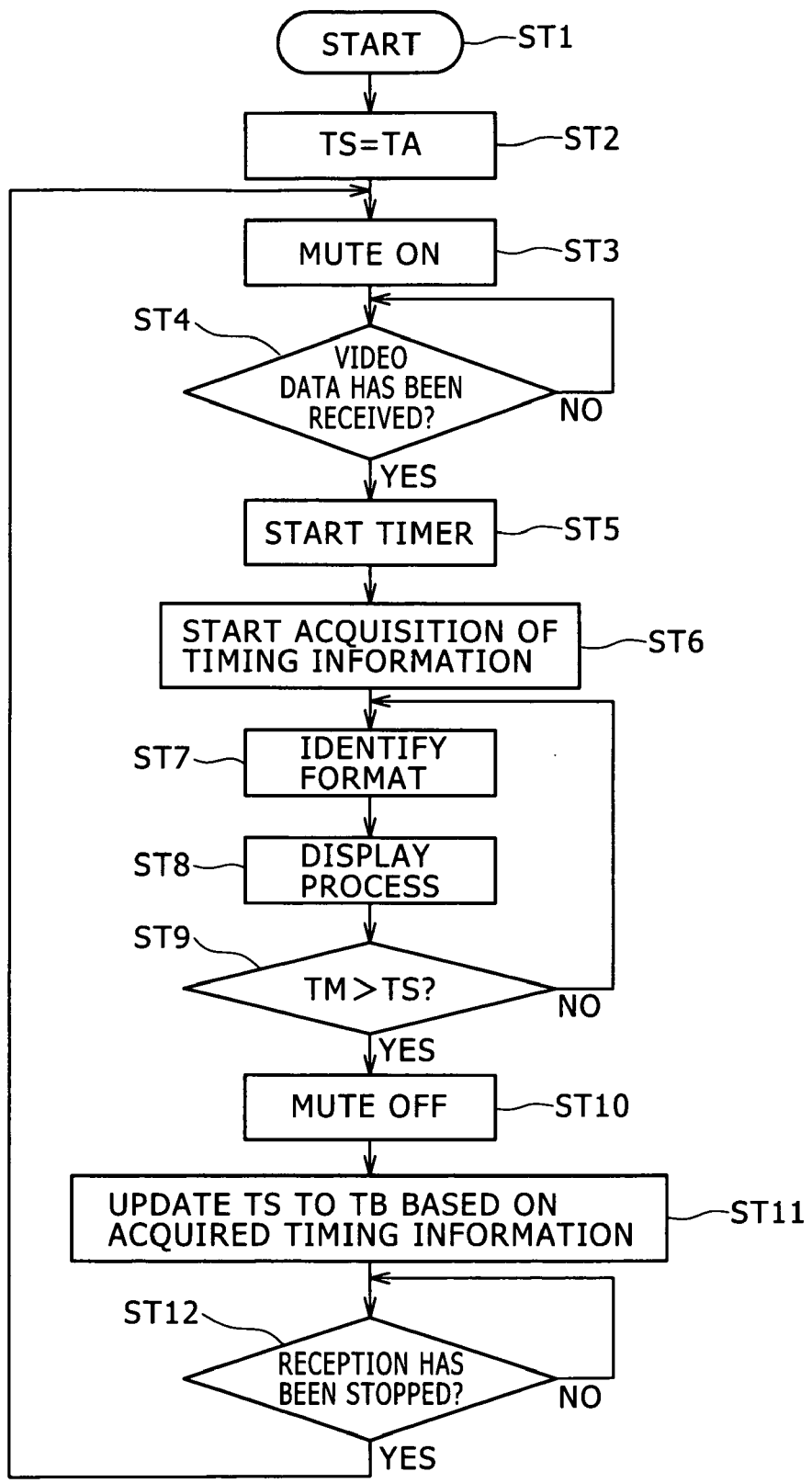
FIG. 8 is a flowchart illustrating a display control process and a reference time length adjustment process performed by a control section of the television receiver.

FIG. 8 shows a flowchart illustrating a display control process and a reference time length adjustment process performed by the control section 143.

First, at step ST1, the control section 143 starts this procedure. For example, the control section 143 starts the procedure when the television receiver 140 has been connected to the DVD recorder 120 via the HDMI cable 210. Then at step ST2, the control section 143 holds an initial value TA in the internal memory 143a as the reference time length TS.

Note that the control section 143 may have initial values TA for various electronic devices that can be connected to the television receiver 140, and use an appropriate one of the initial values TA that corresponds to the connected electronic device by automatically identifying the connected electronic device or in accordance with a user instruction. In this case, when the DVD recorder 120 has been connected to the television receiver 140 as described above, the initial value corresponding to the DVD recorder 120 is used. Also note that the control section 143 may acquire the initial value TA from the connected electronic device and use the acquired initial value TA.

Next, at step ST3, the control section 143 controls the display processing section 149 to turn on the mute. While the mute is on, the images are not displayed on the display panel 150. Then, at step ST4, the control section 143 determines whether the video data (i.e., the video signal) has been received.

If the video data has been received, the control section 143 starts a timer at step ST5, and starts the acquisition of the timing information at step ST6. Then, the control section 143 identifies the format of the video data at step ST7, and performs a display process in accordance with the identified format at step ST8.

Next, at step ST9, the control section 143 determines whether a time TM counted by the timer is greater than the reference time length TS stored in the internal memory 143a. If not TM>TS, the control section 143 returns to step ST7. Meanwhile, if TM>TS, the control section 143 proceeds to step ST10, and controls the display processing section 149 to turn off the mute, resulting in an image output status where the images are displayed on the display panel 150.

Next, at step ST11, the control section 143 generates an updated time length TB based on the acquired timing information. As noted previously, the updated time length TB corresponds to the sum of the greatest of the lengths of the time periods represented by the aforementioned pieces of time length information acquired as the timing information and the predetermined time length. At step ST11, the control section 143 updates the reference time length TS as stored in the internal memory 143a to the updated time length TB.

Next, at step ST12, the control section 143 determines whether the reception of the video data has been stopped. The reception of the video data stops, for example, when the DVD recorder 120 has completed playback of a given content. If the reception of the video data has been stopped, the control section 143 returns to step ST3, and controls the display processing section 149 to turn on the mute, in preparation for the reception of the next video data.

As described above, in the case where, in the AV system 100 as shown in FIG. 1, the images based on the video data transmitted from the DVD recorder 120 are displayed by the television receiver 140, the reference time length TS, which is used as the reference for the length of the time period from the reception of the video data to the start of the image display, is adjusted in the television receiver 140 based on the timing information, which is acquired in connection with the reception of the video data (i.e., the video signal) and which concerns the timings that affect the image display, and the timing at which the display of the images on the display panel 150 is started is controlled based on the reference time length TS. This contributes to avoiding the display of a distorted image effectively, without a considerable delay in the display of the images.

Note that, in the above-described embodiment of the present invention, the reference time length TS stored in the internal memory 143a is updated to the updated time length TB, which is generated based on the acquired timing information, and that only one value as the reference time length TS is stored in the internal memory 143a. Therefore, if the updated time length TB varies each time the video data is received, the effect of avoiding the display of a distorted image may be reduced in extent and precision. As such, it is conceivable to classify the varied updated time lengths TB into groups, each having a moderate range, and store, in the internal memory 143a, a value to be used as the reference time length TS for each group.

FIG. 9 is a diagram for explaining an algorithm for the grouping and the determination of the reference time length. In the following description, it is assumed that the updated time lengths TB are generated (measured) in the following order: 3.1 seconds, 2.8 seconds, 3.2 seconds, 4.2 seconds, 3.8 seconds, 4.6 seconds, and 3.5 seconds.

(a) The first updated time length TB is 3.1 seconds. The 3.1 seconds is determined to form a first group. In this case, an upper-limit value (3.1 seconds) and a lower-limit value (3.1 seconds) of the first group are stored in the internal memory 143a, and the reference time length TS to be used next is adjusted to 3.1 seconds.

(b) The next updated time length TB is 2.8 seconds. The 2.8 seconds is determined to be classified into the first group, because the 2.8 seconds is not more than 0.5 seconds away from the range of the first group. In this case, the upper-limit value (3.1 seconds) and the lower-limit value (2.8 seconds) of the first group are stored in the internal memory 143a, and the reference time length TS to be used next is set to 3.1 seconds.

(c) The next updated time length TB is 3.2 seconds. The 3.2 seconds is determined to be classified into the first group, because the 3.2 seconds is not more than 0.5 seconds away from the range of the first group. In this case, the upper-limit value (3.2 seconds) and the lower-limit value (2.8 seconds) of the first group are stored in the internal memory 143a, and the reference time length TS to be used next is set to 3.2 seconds.

(d) The next updated time length TB is 4.2 seconds. The 4.2 seconds is determined to form a second group, because the 4.2 seconds is more than 0.5 seconds away from the range of the first group. In this case, the upper-limit value (3.2 seconds) and the lower-limit value (2.8 seconds) of the first group and an upper-limit value (4.2 seconds) and a lower-limit value (4.2 seconds) of the second group are stored in the internal memory 143a, and the reference time length TS to be used next is set to 4.2 seconds.

(e) The next updated time length TB is 3.8 seconds. The 3.8 seconds is determined to be classified into the second group, because the 3.8 seconds is more than 0.5 seconds away from the range of the first group but is not more than 0.5 seconds away from the range of the second group. In this case, the upper-limit value (3.2 seconds) and the lower-limit value (2.8 seconds) of the first group and the upper-limit value (4.2 seconds) and the lower-limit value (3.8 seconds) of the second group are stored in the internal memory 143a, and the reference time length TS to be used next is set to 4.2 seconds.

(f) The next updated time length TB is 4.6 seconds. The 4.6 seconds is determined to be classified into the second group, because the 4.6 seconds is more than 0.5 seconds away from the range of the first group but is not more than 0.5 seconds away from the range of the second group. In this case, the upper-limit value (3.2 seconds) and the lower-limit value (2.8 seconds) of the first group and the upper-limit value (4.6 seconds) and the lower-limit value (3.8 seconds) of the second group are stored in the internal memory 143a, and the reference time length TS to be used next is set to 4.6 seconds.

(g) The next updated time length TB is 3.5 seconds. The 3.5 seconds is neither more than 0.5 seconds away from the range of the first group nor from the range of the second group. Accordingly, the first and second groups are integrated to form a new first group. In this case, an upper-limit value (4.6 seconds) and a lower-limit value (2.8 seconds) of the new first group are stored in the internal memory 143a, and the reference time length TS to be used next is set to 4.6 seconds.

Thereafter, the grouping of the updated time lengths TB is performed in accordance with the above-described algorithm each time a new updated time length TB is generated, and the upper-limit value and the lower-limit value of each group are stored in the internal memory 143a. The reference time length TS to be used next is set to the upper-limit value of the group that contains the new updated time length TB.

In the case where the reference time length TS to be used next is adjusted in the above-described manner, only the process of step ST11 is modified in the flowchart of FIG. 8. The grouping in accordance with the algorithm as illustrated in FIG. 9 is simple grouping without the need for a great amount of computation, and has an advantage in that only a limited number of values need to be stored.

In the above-described embodiment, the adjustment of the reference time length TS is performed by updating the reference time length TS stored in the internal memory 143a to the updated time length TB, which is generated based on the acquired timing information (refer to the explanation of step ST11 in FIG. 8). FIG. 10A shows an exemplary transition of the reference time length TS in that case. In FIG. 10A, and in FIGS. 10B and 10C as well, values that are not enclosed by parentheses represent the updated time lengths TB as generated, whereas values within parentheses represent the reference time lengths TS to be stored in the internal memory 143a when the updated time lengths TB outside of the parentheses have been generated. The initial value is 10 seconds.

Alternatively, the adjustment of the reference time length TS may be performed by updating the reference time length TS stored in the internal memory 143a to the updated time length TB generated based on the acquired timing information, not each time the updated time length TB is generated but only when the newly generated updated time length TB has a greater value than any updated time length TB generated so far. FIG. 10B shows an exemplary transition of the reference time length TS in that case. For example, when the newly generated updated time length TB is 4.2 seconds, which is not the greatest of those generated so far, the reference time length TS as stored in the internal memory 143a is maintained at 4.8 seconds. In this exemplary manner of adjustment, the reference time length TS stored in the internal memory 143a can be maintained at the greatest value of the updated time lengths TB generated so far. This contributes to preventing a sudden reduction in the reference time length TS, which might lead to display of a distorted image.

Alternatively, the adjustment of the reference time length TS may be performed by updating the reference time length TS stored in the internal memory 143a to the updated time length TB generated based on the acquired timing information, not each time the updated time length TB is generated but only when the newly generated updated time length TB is out of a tolerance (e.g., ±0.5 seconds) relative to the reference time length TS stored in the internal memory 143a. FIG. 10C illustrates an exemplary transition of the reference time length TS in that case. For example, in the case where the reference time length TS stored in the internal memory 143a is 4.8 seconds and the newly generated updated time length TB is 4.4 seconds, which is within the tolerance, the reference time length TS stored in the internal memory 143a is not updated but maintained at 4.8 seconds. Meanwhile, in the case where the reference time length TS stored in the internal memory 143a is 4.8 seconds and the newly generated updated time length TB is 3.8 seconds, which is out of the tolerance, the reference time length TS stored in the internal memory 143a is updated to 3.8 seconds. This manner of adjustment prevents constant slight changes in the reference time length TS stored in the internal memory 143a.

In the above-described embodiment, when the images based on the video data transmitted from the DVD recorder 120 are displayed in the television receiver 140, the image display is started when the time of the reference time length as adjusted based on the timing information concerning the timings that affect the image display has elapsed since the start of the reception of the video data. This contributes to avoiding the display of a distorted image effectively.

However, this avoidance of the display of a distorted image involves a prolonged delay in the start of the image display. As such, the user may be allowed to select one of two modes as prepared: Clear mode, in which the reference time length as adjusted based on the timing information is used, and Quick mode, in which a relatively short, fixed reference time length is used. The Clear mode forms a first image output mode, while the Quick mode forms a second image output mode.

Figure 11:
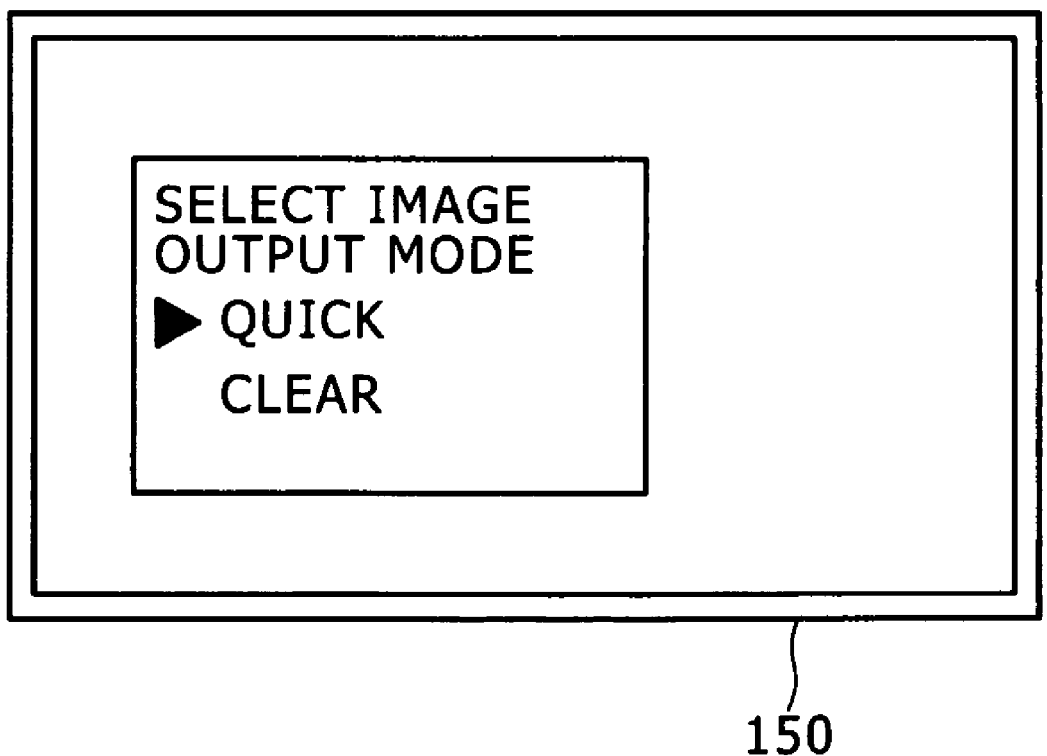
FIG. 11 shows a user interface screen displayed on a display panel when a user selects a mode.

FIG. 11 shows a user interface screen that is displayed on the display panel 150 when the user selects one of the two modes. The user uses this user interface screen to select either the Quick mode or the Clear mode.

Figure 12:
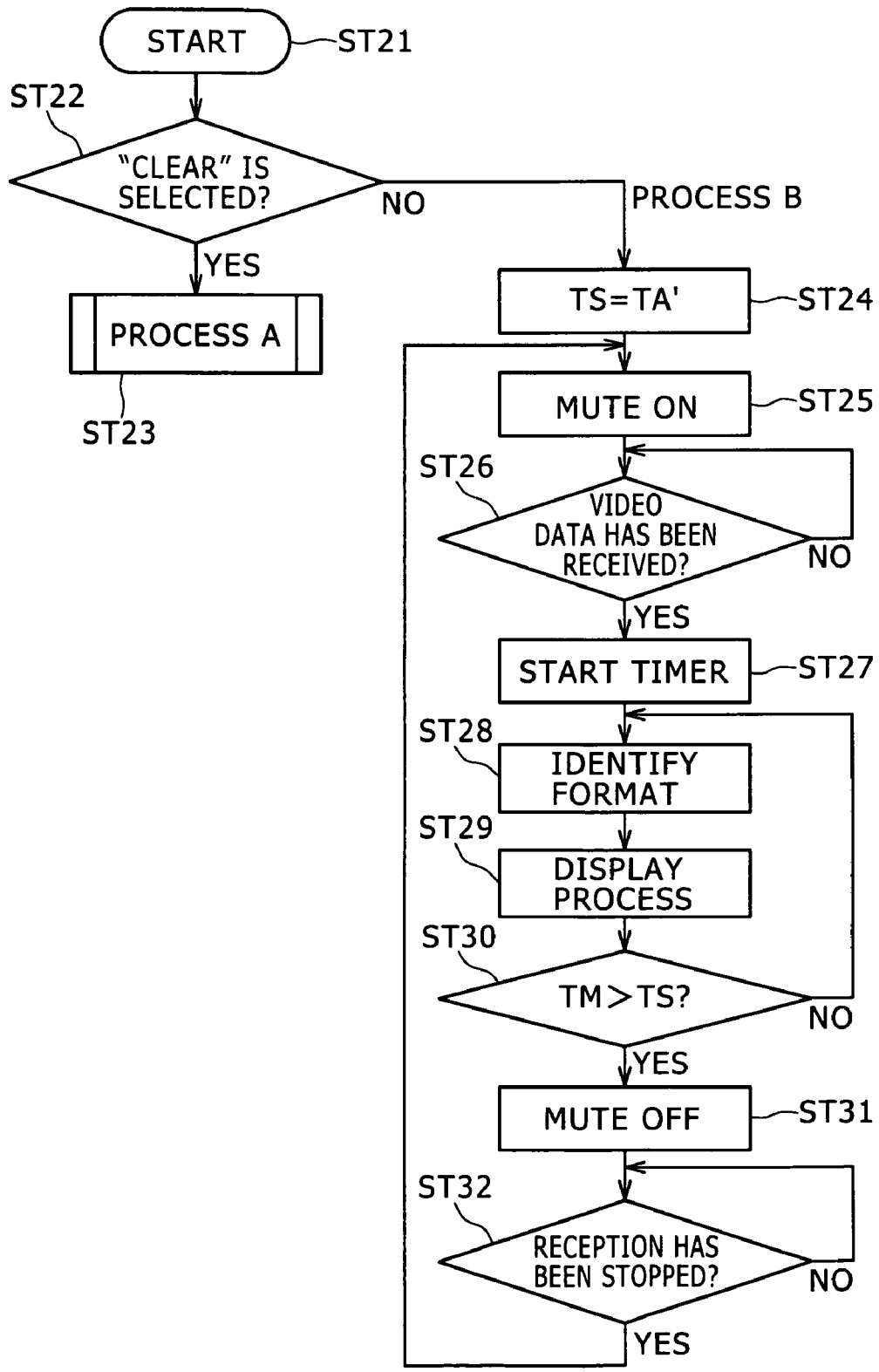
FIG. 12 is a flowchart illustrating a display control process and a reference time length adjustment process performed by the control section of the television receiver in the case where selection of Clear mode or Quick mode is allowed.

FIG. 12 shows a flowchart illustrating a display control process and a reference time length adjustment process performed by the control section 143 in the case where the user is allowed to select either the Clear mode or the Quick mode.

First, at step ST21, the control section 143 starts this procedure. The control section 143 starts the procedure, for example, when the television receiver 140 has been connected to the DVD recorder 120 via the HDMI cable 210. Then, at step ST22, the control section 143 determines whether the Clear mode is selected. When the Clear mode is selected, process A for the Clear mode is performed at step ST23. A description of details of the process A is omitted, since the process A corresponds to the processes of steps ST2 to ST12 in the above-described flowchart of FIG. 8.

Meanwhile, when the Clear mode is not selected, i.e., when the Quick mode is selected, the control section 143 proceeds to step ST24 to perform process B for the Quick mode.

At step ST24, the control section 143 holds an initial value TA' in the internal memory 143a as the reference time length TS. This initial value TA' is relatively small in order for the image display to be started sooner than when the Clear mode is selected. Then, at step ST25, the control section 143 controls the display processing section 149 to turn on the mute. While the mute is on, no images are displayed on the display panel 150.

Next, at step ST26, the control section 143 determines whether any video data (i.e., video signal) has been received. If the video data has been received, the control section 143 starts the timer at step ST27. Then, the control section 143 identifies the format of the video data at step ST28, and performs the display process in accordance with the identified format at step ST29.

Next, at step ST30, the control section 143 determines whether the time TM counted by the timer is greater than the reference time length TS stored in the internal memory 143a. If not TM>TS, the control section 143 returns to step ST28. Meanwhile, if TM>TS, the control section 143 proceeds to step ST31, and controls the display processing section 149 to turn off the mute, resulting in the image output status where the images are displayed on the display panel 150.

Next, at step ST32, the control section 143 determines whether the reception of the video data has been stopped. The reception of the video data stops, for example, when the DVD recorder 120 has completed the playback of the given content. If the reception of the video data has been stopped, the control section 143 returns to step ST25, and controls the display processing section 149 to turn on the mute, in preparation for the reception of the next video data.

In the case where the user is allowed to select either the Clear mode or the Quick mode as described above, it is possible to avoid the display of a distorted image very effectively by selecting the Clear mode, with a prolonged delay in the start of the image display, whereas it is possible to reduce the delay in the start of the image display by selecting the Quick mode, with an increased probability of the display of a distorted image.

According to the above-described embodiment, when the images based on the video data transmitted from the DVD recorder 120 are displayed in the television receiver 140, the start of the image display is controlled in the television receiver 140 using only the reference time length as adjusted based on the timing information. Note, however, that the timing at which the image display is started may be controlled based on whether or not the format is established in addition to based on the reference time length.

In this case, as described above, while the horizontal and vertical resolutions are stable, the control section 143 counts the horizontal synchronization signal to recognize the horizontal resolution and counts the vertical synchronization signal to recognize the vertical resolution, and establishes the format. The control section 143 continues to judge that the format is established from the establishment of the format until the reception of the video data is stopped. In this sense, the control section 143 forms a format establishment judging section.

Figure 13:
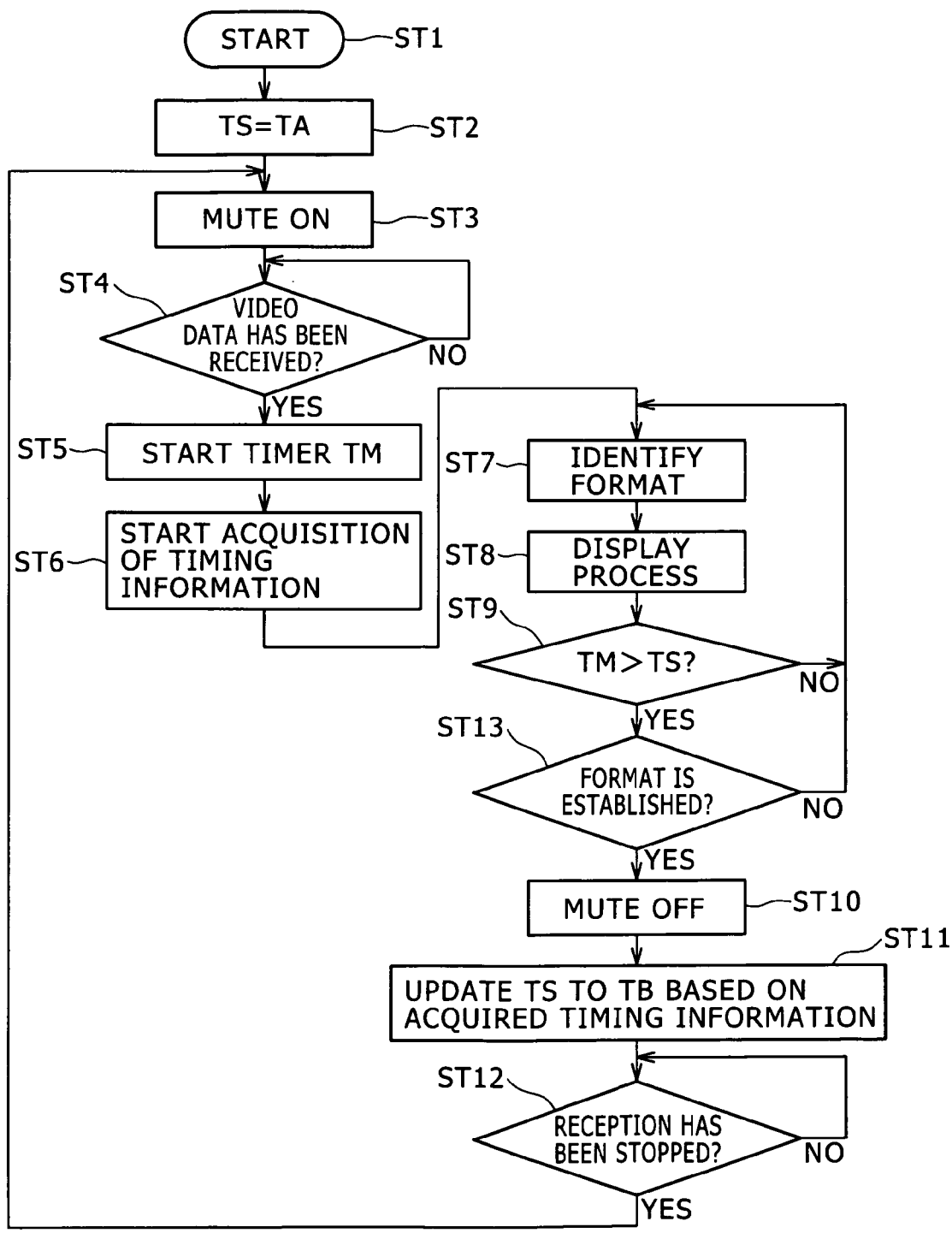
FIG. 13 is a flowchart illustrating a display control process and a reference time length adjustment process performed by the control section of the television receiver in the case where the timing at which image display is started is controlled based on whether or not a format is established in addition to based on the reference time length.

FIG. 13 shows a flowchart illustrating a display control process and a reference time length adjustment process performed by the control section 143 in the case where the timing at which the image display is started is controlled based on whether or not the format is established in addition to based on the reference time length. In the flowchart of FIG. 13, steps that have their equivalents in FIG. 8 are assigned the same reference characters as those of their equivalents.

If TM>TS at step ST9, the control section 143 proceeds to step ST13, and determines whether or not the format is established. If the format is not established, the control section 143 returns to step ST7. Meanwhile, if the format is established, the control section 143 proceeds to step ST10, and controls the display processing section 149 to turn off the mute, resulting in the image output status where the images are displayed on the display panel 150.

The other processes in the flowchart of FIG. 13 are the same as their equivalents in the flowchart of FIG. 8, and therefore, detailed descriptions thereof are omitted.

As described above, in the case where the timing at which the image display is started is controlled based on whether or not the format is established in addition to based on the reference time length as adjusted based on the timing information, the images are not displayed unless the format is established, even if the time of the reference time length as adjusted by the reference time length adjustment section has elapsed. This contributes to reducing the probability of the display of a distorted image, because the images are not displayed until the format is established.

FIGS. 14A to 14E show an example of signal timing. FIG. 14B represents the state of the reception of the video data (i.e., the video signal). In FIG. 14B, periods in which the video data is being received are indicated by diagonal shading. The control section 143 judges that the video data is being received, when the synchronization signals (i.e., the horizontal and vertical synchronization signals) are received by the HDMI reception section 145.

FIG. 14C represents a stable state of the resolution. In FIG. 14C, periods in which the resolution is stable are indicated by diagonal shading. While the horizontal and vertical resolutions are in the stable state, the control section 143 counts the horizontal synchronization signal to recognize the horizontal resolution and counts the vertical synchronization signal to recognize the vertical resolution, and establishes the format. The control section 143 continues to judge that the format is established from the establishment of the format until the reception of the video data is stopped. Specifically, the control section 143 continues to judge that the format is established from time point t22, at which the format is established, until time point t23, at which the reception of the video data is stopped. In addition, the control section 143 continues to judge that the format is established from time point t25, at which the format is established again, onward.

FIG. 14D represents the state of the HDCP authentication. In FIG. 14D, a period after the authentication is indicated by diagonal shading. The control section 143 recognizes, via the display data channel (DDC), that the authentication has been completed in the DVD recorder 120. FIG. 14E represents the state of the detection of the color space. In FIG. 14E, periods in which the color space is being detected are indicated by diagonal shading. The control section 143 detects the color space information via the auxiliary video information (AVI) InfoFrame inserted in the blanking period of the video signal.

FIG. 14A represents the state of the image output on the display panel 150. In FIG. 14A, periods in which the image output is in progress are indicated by diagonal shading. At time point t24, at which the time of the reference time length TS has elapsed since time point t21, at which the reception of the video data was started, the mute is not turned off because the format has not been established yet. At a subsequent time point t25, at which the format is established, the mute is turned off to start the image output.

As described above, in the case where the timing at which the image display is started is controlled based on whether or not the format is established in addition to based on the reference time length TS, the images are not displayed unless the format is established, even if the time of the reference time length TS has elapsed. This prevents the display of a distorted image from the time point t24 until the time point t25.

Note that, at the time of a signal switch in HDMI, if a no-signal period is followed by the HDCP authentication operation, a period in which video mute has been occurring may be prolonged. Because no images are displayed in this prolonged period, the user may become worried. Because the control section 143 of the television receiver 140 is capable of recognizing that the authentication operation is in progress, the control section 143 may display a message such as "Authentication is in progress" or "Performing HDCP authentication" on the display panel 150 during that period, in order to prevent the user from becoming worried. FIG. 15A illustrates an exemplary transition of the image display in the case where such a message is not displayed, whereas FIG. 15B illustrates an exemplary transition of the image display in the case where such a message is displayed.

In the above-described embodiments, the HDMI is used as a communication interface between the electronic devices. Note, however, that the present invention is also applicable, in a similar manner, to other systems in which other communication interfaces than the HDMI are used. Further, in the above-described embodiments, the HDMI cable is used to connect the electronic devices. Note, however, that the present invention is also applicable, in a similar manner, to other systems in which the electronic devices are connected in a wireless manner.

The present invention has been devised to avoid the display of a distorted image effectively without a considerable delay in the display of the images. The present invention is applicable, for example, to an AV system including an AV source and a television receiver, a projector, or other displays connected to the AV source via an HDMI interface.

It should be understood by those skilled in the art that various modifications, combinations, sub-combinations and alterations may occur depending on design requirements and other factors insofar as they are within the scope of the appended claims or the equivalents thereof.

What is claimed is:

1. A reception apparatus, comprising:
   a signal reception section configured to receive a video signal transmitted via a transmission path;
   an image display section configured to process the video signal received by said signal reception section to display an image;
   a timing information acquisition section configured to acquire timing information in connection with reception of the video signal by said signal reception section, the timing information concerning timing that affects the image displayed by said image display section;
   a reference time length adjustment section configured to adjust a reference time length based on the timing information acquired by said timing information acquisition section, the reference time length being used as a reference for a length of a time period from the reception of the video signal by said signal reception section to start of image display by said image display section; and
   a display control section configured to control timing at which the image display by said image display section is started, based on the reference time length adjusted by said reference time length adjustment section, wherein said reference time length adjustment section generates a new reference time length based on the timing information acquired by said timing information acquisition section, and updates the reference time length stored in a storage section by referring to the new reference time length, and said display control section controls the timing at which the image display by said image display section is started, based on the reference time length stored in the storage section.

2. The reception apparatus according to claim 1, wherein said reference time length adjustment section replaces the reference time length stored in the storage section with the new reference time length.

3. The reception apparatus according to claim 1, wherein said reference time length adjustment section replaces the reference time length stored in the storage section with the new reference time length, if the new reference time length is greater than the reference time length stored in the storage section.

4. The reception apparatus according to claim 1, wherein said reference time length adjustment section replaces the reference time length stored in the storage section with the new reference time length, if the new reference time length is greater or less than the reference time length stored in the storage section by more than a predetermined length of time.

5. The reception apparatus according to claim 1, wherein said reference time length adjustment section groups the new reference time length, and replaces the reference time length stored in the storage section with an upper-limit value of a group including the new reference time length.

6. The reception apparatus according to claim 5, wherein, when grouping the new reference time length, said reference time length adjustment section classifies the new reference time length into an existing group if the new reference time length is within a predetermined length of time of a range of the existing group, the range being defined by an upper-limit value and a lower-limit value of the existing group, and classifies the new reference time length into a new group if the new reference time length is not within the predetermined length of time of the range of any existing group, the range being defined by the upper-limit value and the lower-limit value of the existing group.

7. A method of controlling image output by a reception apparatus including a signal reception section configured to receive a video signal transmitted via a transmission path and an image display section configured to process the video signal received by the signal reception section to display an image, the method comprising the steps of:

acquiring timing information in connection with reception of the video signal by the signal reception section, the timing information concerning timing that affects the image displayed by the image display section;

adjusting a reference time length based on the timing information acquired by said acquiring, the reference time length being used as a reference for a length of a time period from the reception of the video signal by the signal reception section to start of image display by the image display section; and controlling timing at which the image display by the image display section is started, based on the reference time length adjusted by said adjusting, wherein the adjusting step includes generating a new reference time length based on the timing information acquired by the acquiring step, and updates the reference time length stored in a storage section by referring to the new reference time length, and the controlling step includes controlling the timing at which the image display by said image display section is started, based on the reference time length stored in the storage section.

8. A reception apparatus, comprising:

signal reception means for receiving a video signal transmitted via a transmission path;

image display means for processing the video signal received by said signal reception means to display an image;

timing information acquisition means for acquiring timing information in connection with reception of the video signal by said signal reception means, the timing information concerning timing that affects the image displayed by said image display means;

reference time length adjustment means for adjusting a reference time length based on the timing information acquired by said timing information acquisition means, the reference time length being used as a reference for a length of a time period from the reception of the video signal by said signal reception means to start of image display by said image display means; and display control means for controlling timing at which the image display by said image display means is started, based on the reference time length adjusted by said reference time length adjustment means, wherein said reference time length adjustment means generates a new reference time length based on the timing information acquired by said timing information acquisition means, and updates the reference time length stored in a storage section by referring to the new reference time length, and said display control means controls the timing at which the image display by said image display means is started, based on the reference time length stored in the storage section.

* * * * *